United States Patent [19]

Benninger et al.

[11] 4,112,476
[45] Sep. 5, 1978

[54] GROUND FAULT PROTECTION SYSTEM

[75] Inventors: Hans Benninger, Nussbaumen; Fritz Eggimann, Zurich; Ole Enkegaard, Gebenstorf, all of Switzerland

[73] Assignee: Patelhold Patentverwertungs & Elektro-Holding AG, Glarus, Switzerland

[21] Appl. No.: 798,760

[22] Filed: May 20, 1977

[30] Foreign Application Priority Data

May 25, 1976 [CH] Switzerland ............... 6565/76

[51] Int. Cl.² ........................................ H02H 7/26
[52] U.S. Cl. ............................... 361/42; 361/68
[58] Field of Search ............... 361/42, 62, 64, 66, 361/68, 69; 328/135

[56] References Cited

U.S. PATENT DOCUMENTS

3,643,160  2/1972  Ray et al. ................. 361/68 X

Primary Examiner—Harry E. Moose, Jr.
Attorney, Agent, or Firm—Frank L. Durr; Orville N. Greene

[57] ABSTRACT

A detection circuit for remote release apparatus is disclosed which monitors a circuit carrying high-voltage between two connection points A and B and disconnects the circuit from the rest of a high-voltage network by automatically opening two power switches when a short circuit is detected. The ground fault protection system includes a pair of power switches for disconnecting points A and B from the remainder of a high-voltage network when a fault is detected in the high-voltage carrying circuit. A different one of a pair of detection circuits are associated with each point A and B. Each detection circuit causes both power switches to open when a fault is detected. The fault detection circuit associated with point A detects faults occurring in the high-voltage carrying circuit at any location extending from point A to at least one-half a distance to point B. The detection circuit associated with point B detects faults occurring in the high-voltage carrying circuit at any location extending from point B to at least one-half the distance to point A.

7 Claims, 8 Drawing Figures

GROUND FAULT PROTECTION SYSTEM

BACKGROUND OF THE INVENTION

The present invention relates to a detection for remote release apparatus which monitors a circuit carrying high-voltage between two connecting points A and B and disconnects the circuit from the rest of the high-voltage network by automatically opening two power switches when a short circuit is detected. Circuits of the foregoing type are generally known in the art and are exemplified by the system of FIG. 1. As shown therein, a circuit to be protected, which for instance is in the form of a part of a high voltage line HS between the points designated A and B, is to be disconnected from the rest of the high voltage network by the automatic opening of the two power switches $C_1$ and $C_2$ should short circuits occur on the line HS. Such short circuits are frequently caused by lightning striking the line.

Figure 1:
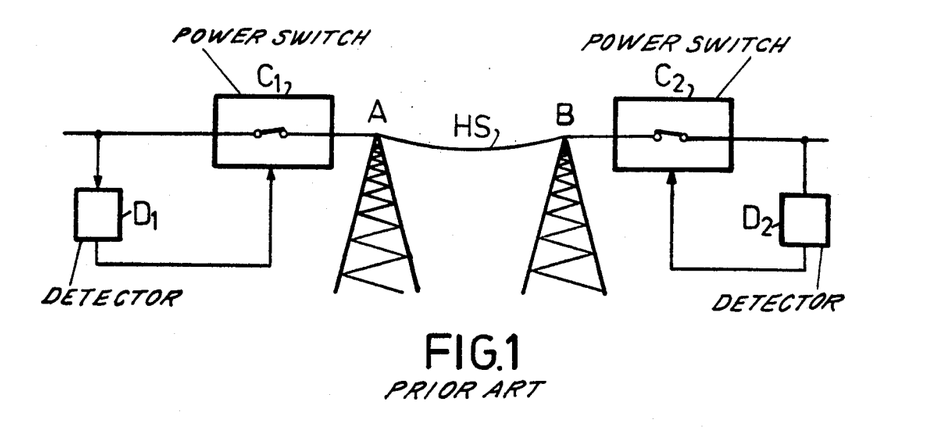
FIG. 1 illustrates a known ground fault protection system.

In order to solve this problem, the prior art utilized two short circuit detectors $D_1$ and $D_2$, preferably developed as distance relays. These distance relays generate a command signal and apply the same to the two switches $C_1$ and $C_2$ when a short circuit is detected. The greater the distance between the short circuit and either point A or B, respectively, the greater the time required for $D_1$ and $D_2$, respectively, to detect the short circuit. If the location of short circuit is further away from point A or B than about 85% of the length of the line to the detector. It is impossible for one or the other of the detection circuits $D_1$, $D_2$ to generate a command signal within a useful period of time. Since, however, at least one of the distance relays will respond to any short circuit located between points A and B, provision can be made to apply the command signal generated by either detection circuit to each of the two switches $C_1$ and $C_2$.

In providing a suitable transmission circuit for transmitting the command signal from a local detector (e.g. $D_1$) to a remote switch (e.g. $C_2$), the transmission system must be designed with the following considerations in mind:

(a) The release commands occur very infrequently (typically one to ten commands a year). It must therefore be seen to it that no additional false release commands can be produced by disturbances in the transmission systems.

(b) Since a short circuit on the circuit being protected can disturb the signal on the transmission channel, provision must be made to compensate for noise created by a short circuit when a command signal is to be transmitted.

DETAILED DESCRIPTION OF THE PREFERRED EMBODIMENTS

Figure 3:
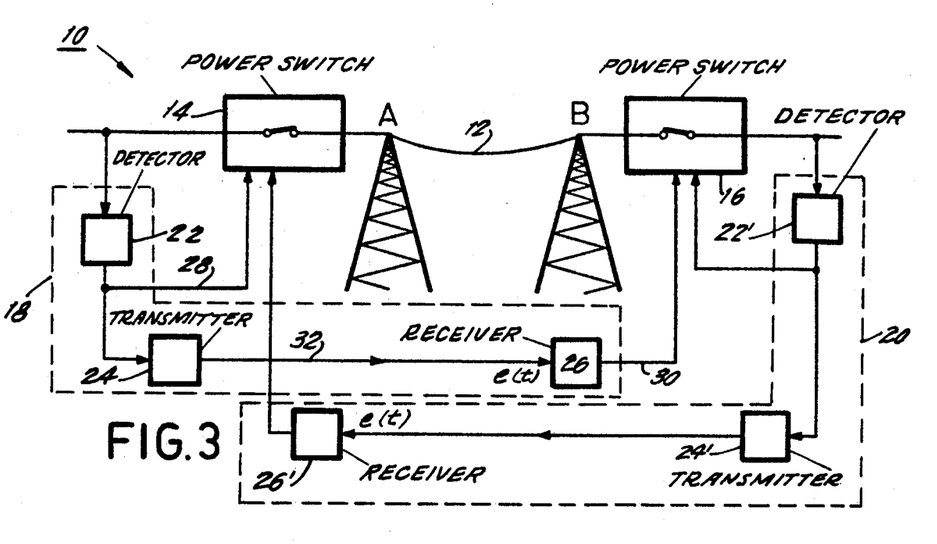
FIG. 3 illustrates a ground fault protection system constructed in accordance with the principles of the present invention.

Referring now to the drawings wherein like numerals indicate like elements, there is shown in FIG. 3 a ground fault protection system constructed in accordance with the principles of the present invention and designated generally as 10. As will be described in greater detail below, ground fault protection system 10 monitors the condition of a high-voltage carrying circuit 12 extending between points A and B and disconnects circuit 12 from the remainder of a high-voltage power distribution system (not shown) whenever a ground fault condition is present in the circuit 12.

System 10 comprises a pair of power switches 14, 16 and a pair of detection circuits 18, 20 which cause switches 14 and 16 to open whenever a fault is detected to be present in circuit 12.

Figure 2:
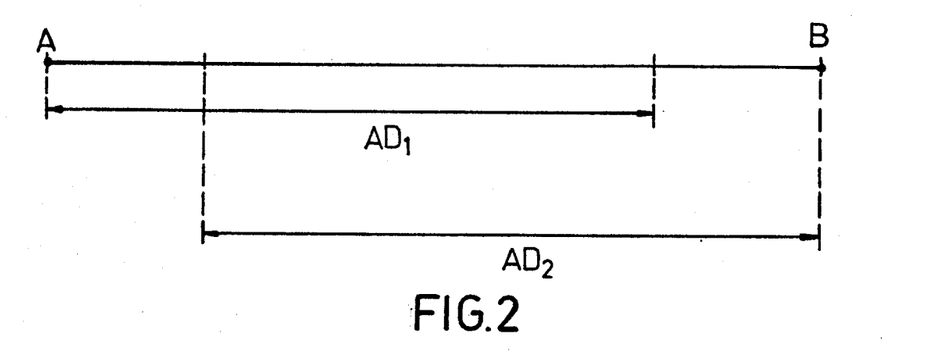
FIG. 2 illustrates the effective distance over which the detectors of FIG. 1 can detect faults in the high-voltage carrying line HS.

As shown in FIG. 2, the response range AD1 and AD2 of detector circuits D1 and D2 do not traverse the entire length of the high-voltage carrying circuit. They do, however, overlap. For this reason, the present invention utilizes two detectors 22 for monitoring circuit 12 and for causing its associated detection circuit 18, 22 to open power switches 14 and 16. As illustrated in FIG. 3, detection circuit 18 is primarily responsible for detecting faults in line 12 which are located nearer to point A than point B and detection circuit 20 is primarily responsible for detecting faults in line 12 which are located nearer to point B than point A.

Each detection circuit 18, 20 is identical in structure and operation. Accordingly, only the structure and operation of detection circuit 18 will be described in detail. Detection circuit 18 comprises a detector 22, a transmitter 24 and a receiver 26 and generates output signals at its outputs 28, 30 whenever a fault condition is detected to be present in line 12. The output signals at outputs 28, 30, respectively, are applied to power switches 14, 16 and cause power switches 14, 16 to open.

Detector 22 monitors the condition of circuit 12 and generates an output signal whenever it detects a fault condition in circuit 12. Such detectors are well known in the art and need not be described in detail. Preferably, detector 12 is a distance relay which generates an output signal within the time requirement of protection system 10 for any fault located within 85% of the distance between points A and B. The output of detector 22 is applied to both power switch 14 and to transmitter 24. Whenever detector 22 generates an output signal indicative of the presence of a fault in circuit 12, it causes power switch 14 to open and transmitter 24 to generate a release command signal.

Transmitter 24 is responsive to the condition of the output of detector 22 and generates a quiescent output signal whenever detector 22 does not detect a fault in circuit 12. Transmitter 24 also generates a release command signal whenever it detects a fault in circuit 12. The output of transmitter 24 is transmitted along a transmission line 32 to receiver 26. Receiver 26 is responsive to the signal generated by transmitter 24 and causes power switch 16 to open whenever a release command signal is generated by transmitter 24.

Figure 4:
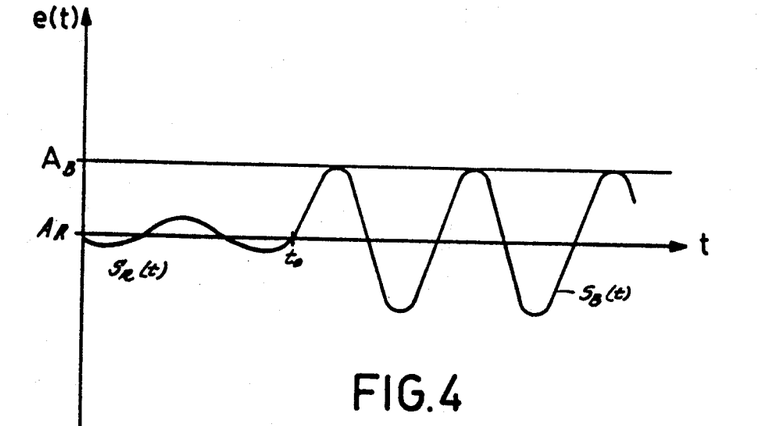
FIGS. 4 and 5 illustrate sample waveforms of the output signal of the transmitters of FIG. 3.
Figure 5:
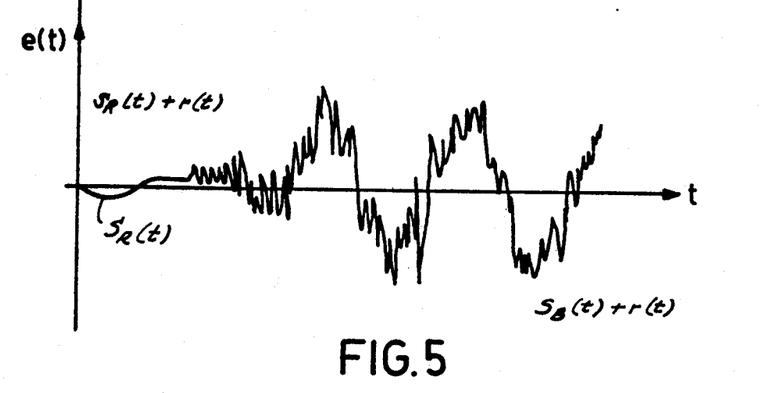

The operation of ground fault protection system 10 can best be understood with reference to FIGS. 4 and 5. FIG. 4 illustrates one possible waveform of the signal $e(t)$ generated by transmitter 24 and applied to receiver 26. $S_R(t)$ represents the quiescent signal output of transmitter 24 while $S_B(t)$ represents the release command signal output of transmitter 24 generated at time $t = t_o$. By way of example, the mathematical descriptions of the release command and quiescent output signals may be, respectively, TI, $S_B(t) = A_B \sin(wt)$ and $$S_R(t) = A_R \sin(wt).$$

In both cases, $S_B(t)$ and $S_R(t)$ are assumed to be the output of transmitter 24 in the absence of disturbances (noise) in communication line 32. If, however, the transmission line is suddenly disturbed at the instant transmitter 24 generates the release command signal (e.g. at $t = t_o$), the output of transmitter 24 may look like that shown in FIG. 5. The mathematical description of the release command and quiescent output signals are now:

$$e_B(t) = S_B(t) + r(t) = A_B \sin(wt) + r(t),$$

$$e_R(t) = S_R(t) + r(t) = A_R \sin(wt) + r(t),$$

where $r(t)$ designates the disurbance or noise signal.

Most of the prior art studies which are concerned with this problem, proceed from the basis that the average disturbance power may be considered to be a known quantity and compensate for the disturbance signal on that basis. In contrast, the present invention solves the problem by providing a detection circuit which is fully operable without prior knowledge of the power of the disturbance signal $r(t)$. Naturally, this constitutes a considerable advance in the direction of expansion of the field of use.

In accordance with the present invention the foregoing problem is solved by applying the output $e(t)$ of transmitter 24 to both a quiescent-signal generator and a command-signal generator in the receiver 26 and by causing the quiescent and command signal generators to act upon signal $e(t)$ in such a manner that the output signal of the quiescent-signal generator corresponds to the reception signal $e(t)$ in the quiescent case (i.e. $S_R(t)$) and that the output of the command signal generator corresponds to the reception signal $e(t)$ in the command case (i.e. $S_B(t)$) and furthermore by substracting the signals $S_R(t)$ and $S_B(t)$ from the signal $e(t)$ so as to generate two difference signals:

$$d_R(t) = e(t) - S_R(t)$$

and $$d_B(t) = e(t) - S_B(t).$$

Finally, the difference signals are applied to arithmetic units which form the following signals:

$$w_R = \frac{1}{\Lambda^2} \int_{t-T}^{t} [e(\tau) - S_r(\tau)]^2 d\tau \quad (1)$$

$$w_B = \int_{t-T}^{t} [e(\tau) - S_B(\tau)]^2 d\tau \quad (2)$$

Where $\Lambda$ is a positive factor and T a delay time which can be selected as desired.

If a quiescent signal is generated by transmitter 24, $w_R$ is proportional to the disturbance energy received during the interval $t-T, t$. If a command signal is sent out, then this is true of $w_B$.

Finally, receiver 26 includes a comparator which compares the signals $w_R$ and $w_B$ and generates an output signal which causes power switch 16 to open when $w_R > w_B$.

Figure 6:
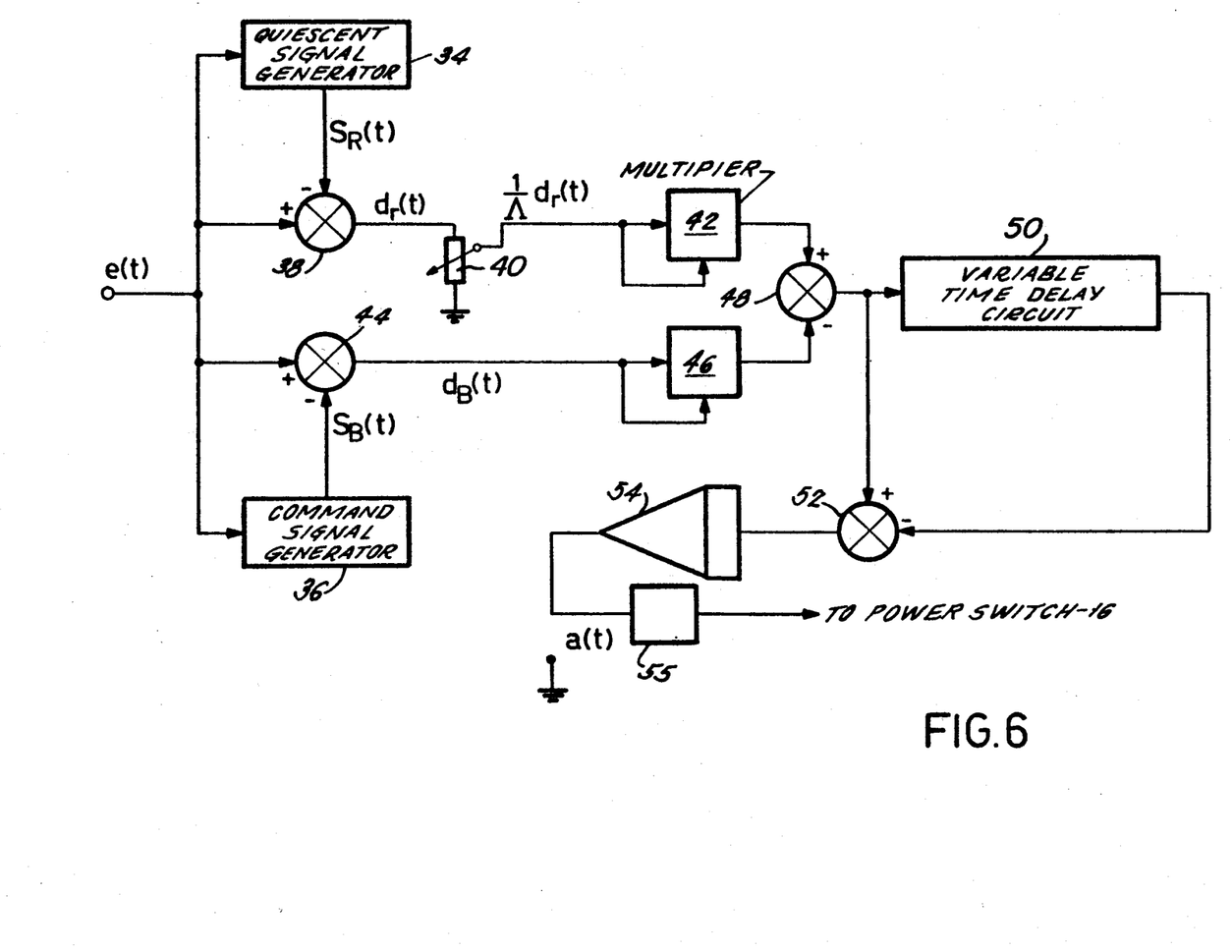
FIG. 6 illustrates a first embodiment of the receivers of FIG. 3.

One possible structure of receiver 26 is illustrated in FIG. 6. As shown therein, the transmitted signal $e(t)$ is applied to a quiescent signal generator 34 and a command signal generator 36. The output of quiescent signal generator 34 corresponds to the transmitted signal $e(t) = S_R(t)$ in the quiescent case assuming an undisturbed transmission. The output of command signal generator 36 corresponds to the transmitted signal $e(t) = S_B(t)$ in the command case assuming an undisturbed transmission.

The difference signal $d_R(t)$ appears at the output of subtraction circuit 38 which subtracts the transmitted signal $e(t)$ from the quiescent signal $S_R(t)$ generated by quiescent signal generator 34. Difference signal $d_R(t)$ is applied to a divider 40 which divides the difference signal by the adjustable factor $\Lambda$. The divided signal $1/\Lambda d_R(t)$ is then applied to a squarer circuit 42 which may be a simple multiplier circuit as shown.

The factor $\Lambda$ is selected in accordance with the existing conditions; if a release command which has been suppressed due to disturbed communications transmission, (i.e. a loss of a command) does less damage than an additional release command caused by a disturbance (i.e. an erroneous command) then $\Lambda$ is selected less than 1. In case of remote release, it is preferable for $\Lambda$ to be greater than 1 (for instance $\Lambda = 2.5$), since it is desired to keep the number of erroneous commands as small as possible. The exact selection of the factor $\Lambda$ depends on the circumstances, which can be empirically taken into account in each individual case.

The transmitted signal $e(t)$ is also applied to command signal generator 36 which generates the command signal $S_B(t)$. The difference signal $d_B(t)$ is then formed in subtraction circuit 44 and applied to a squarer circuit 46. The output of squarer circuit 46 is subtracted from the output of squarer circuit 42 in the subtraction circuit 48 and applied to both variable time delay circuit 50 and to the adding input of subtraction circuit 52, with the delay T and opposite sign. The variable time delay circuit 50 delays the signal applied to its input by a time delay T and applies its output to the subtraction circuit 52. The output of subtraction circuit 52 is applied to integrator 54. If the output signal $a(t)$ of the integrator 54 is positive, an output signal is generated by discriminator 55 and applied to power switch 16 thereby causing power switch 16 to open.

Increasing the delay time from $T_1$ to $T_2$ results in a better suppression of erroneous commands. By reducing the multiplication factor from $\Lambda_1$ to $\Lambda_2$, the probability of an erroneous command increases, with simultaneous decrease in the probability of the loss of a command. It is thus found that by doubling the number of detection circuits (18, 20) to four such that the inputs of two detection circuits are connected in common while their outputs are connected in an "OR" circuit brings about the following advantage:

In the case of a small disturbance level, a first detection circuit of either pair having a shorter delay time $T_1$ than the remaining detector of the pair will detect a command earlier than the remaining detector of the pair. With a large disturbance level, the first detector may no longer respond due to the higher factor $\Lambda_1$ set. The command can however be detected somewhat later by the remaining detector of the pair. The reduction in the detection time obtained in the case of a small disturbance level goes hand in hand with an insignificant increase in the probability of an erroneous command.

Returning now to the embodiment of FIG. 6, the manner of operation of the receiver 24 can be mathematically described as follows:

$$\text{Formation of } w_R = \frac{1}{\Lambda^2} \int_{t-T}^{t} [e(\tau) - S_R(\tau)]^2 d\tau \qquad 1.$$

$$\text{Formation of } w_B = \int_{t-T}^{t} [e(\tau) - S_R(\tau)]^2 d\tau \qquad 2.$$

3. If $w_R$ is greater than $w_B$, a release command will be given. Here there may suitably be employed a comparator unit in which the output signal $a(t)$ of the integrator is compared with the zero level. If $a(t)$ is greater than 0, then a signal appears at the comparator output which is fed directly to the corresponding power switch (for instance 16) and opens that switch.

Figure 7:
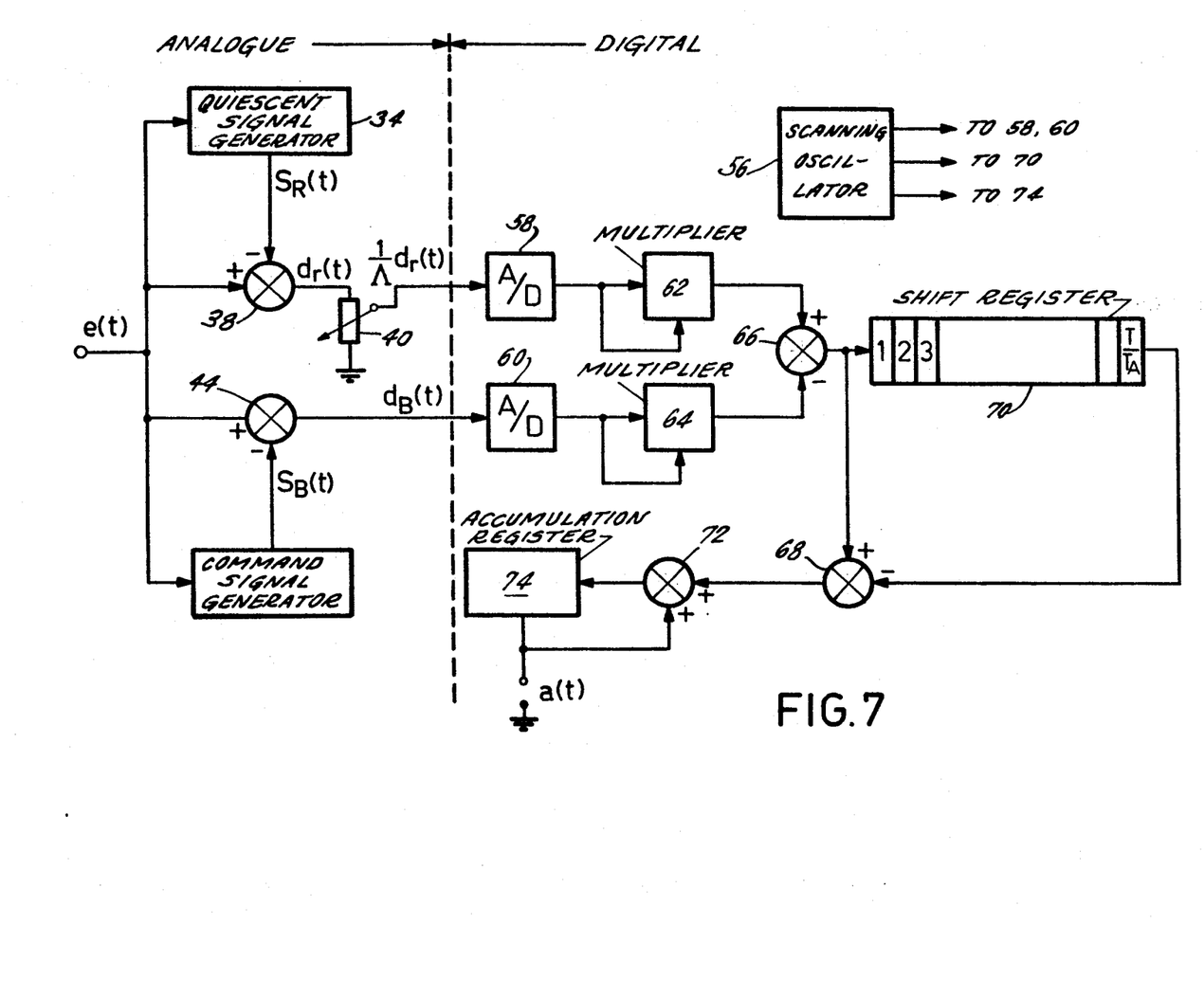
FIG. 7 illustrates a second embodiment of the receivers of FIG. 3.

Naturally, receiver 26, or a part thereof, can also be developed in digital technique. FIG. 7 shows an embodiment in which the signals are first processed by analog technique as in FIG. 6 but are then periodically scanned, controlled by a scanning oscillator 56 having a frequency $f = 1/T_A$, and digitalized in the analog digital (A/D) converters 58, 60. The further processing is effected in the digital squarer circuits 62, 64 which again can be simple digital multiplier circuits. The outputs of squarer circuits 62, 64 are applied to subtraction circuit 66 and the difference is applied to both subtraction circuit 68 and digital shift register 70. Shift register 70 produces the desired time delay T. The output of subtraction circuit 68 is applied to subtraction circuit 72, which cooperates with accumulation register 74 to form the desired integration.

Each of the two analogue-digital converters 58, 60 can advantageously be so designed that it has a square characteristic. In this way the digital squarers 62, 74 can be omitted.

The operation of the circuit of FIG. 7 can be described as follows:

$$\text{Formation of } w_R = \frac{1}{\Lambda^2} \sum_{i=\frac{t-T}{T_A}}^{\frac{t}{T_A}} [e(i \cdot T_A) - S_R(i \cdot T_A)]^2 \qquad 1.$$

$$\text{Formation of } w_B = \sum_{i=\frac{t-T}{T_A}}^{\frac{t}{T_A}} [e(i \cdot T_A) - S_B(i \cdot T_A)]^2 \qquad 2.$$

If $W_R$ is greater than $w_B$, an output signal is generated causing power switch 16 to open.

A computer (microprocessor) programmed in suitable manner can be used to advantage for the signal evaluation.

With the receiver proposed in accordance with the invention, the above requirements noted on page 2 can be satisfied to a considerable extent.

In a remote release connection the function of the transmission channel must be continuously monitored. If the connection is so greatly disturbed that a command which may have been sent can no longer be received, an optical and/or acoustic alarm must be given off. The same is true of an interruption in the connection.

Such an alarm signal is obtained by processing the signals $d_R(t)$ and $d_B(t)$, as shown in FIG. 6, in an arithmetic circuit 78 and in addition by deriving a corresponding signal $a_Q(t)$ in a second identical arithmetic circuit (see FIG. 8) 80 with the use of a different divisor $\Lambda_Q$ instead of $\Lambda$, in addition to the signal $a(t)$. We have: $\Lambda Q \approx 1/\Lambda$. The signal $a_Q(t)$ in the second circuit is positive if the transmission quality drops below a value which is dependent on the value of $\Lambda_Q$ and also if a command signal is received (i.e. $a(t)$ greater than 0). Poor transmission quality accordingly is always present when $a_Q(t)$ is greater than 0 and at the same time $a(t)$ is less than 0.

Figure 8:
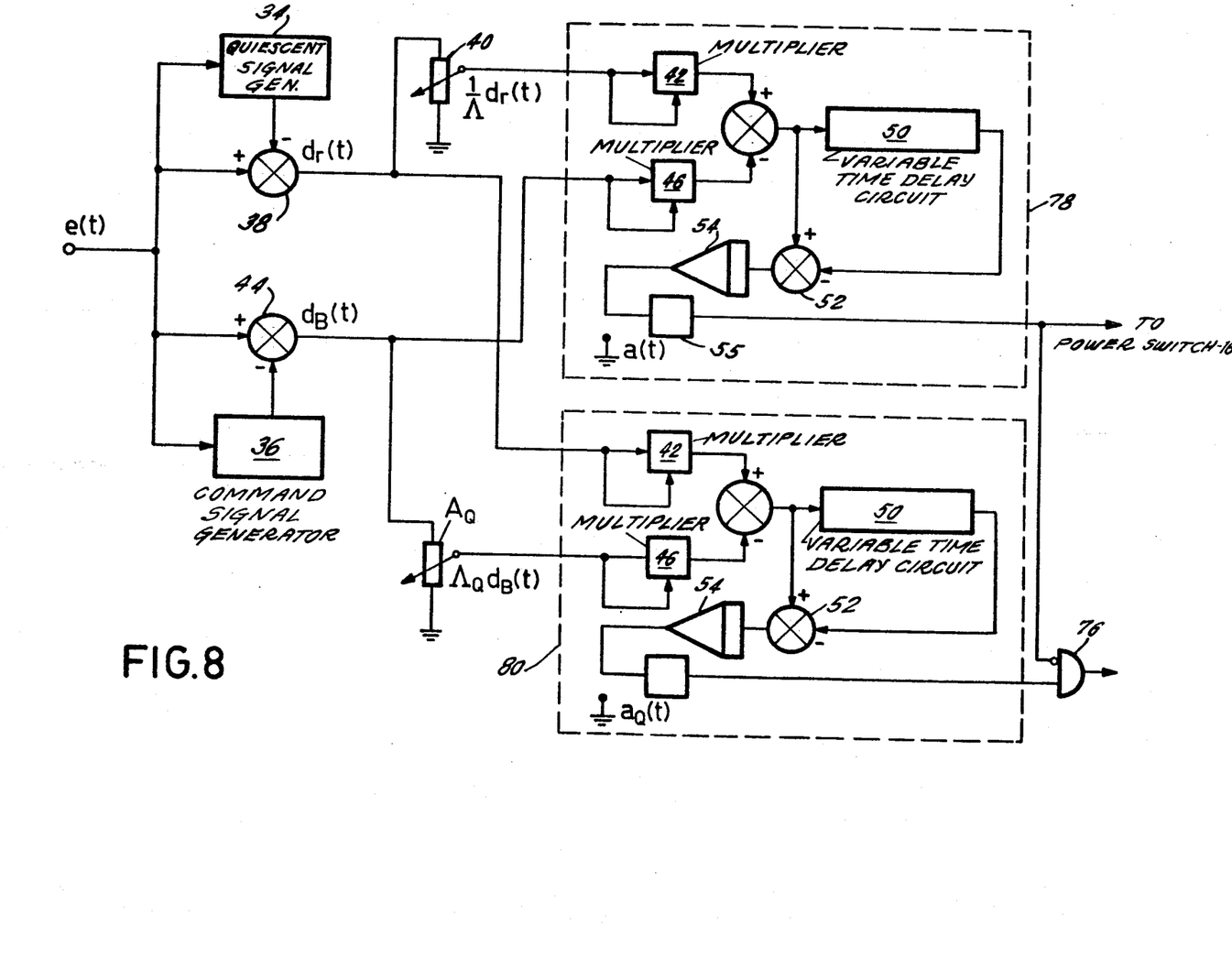
FIG. 8 illustrates a third embodiment of the receivers of FIG. 3 including an alarm feature.

The monitoring circuit 76 converts precisely this condition into an alarm signal. Monitoring circuit 76 is an AND gate having an inverting and a non-inverting input. The output of arithmetic circuit 78 is applied to the inverting input of monitoring circuit 76 while the output of arithmetic circuit 80 is applied to the non-inverting input of monitoring circuit 76. Accordingly, monitoring circuit 76 generates an alarm output signal whenever $a_Q(t)$ is greater than zero and $a(t)$ is less than zero.

The present invention may be embodied in other specific forms without departing from the spirit or essential attributes thereof and, accordingly, reference should be made to the appended claims, rather than to the foregoing specification as indicating the scope of the invention.

What is claimed is:

1. A ground fault protection system for monitoring a circuit carrying high-voltage between two points A and B and for disconnecting said circuit from the remainder of a high-voltage network when a fault is detected in said circuit, said system comprising:
   (a) first and second power switches for disconnecting points A and B, respectively, from the remainder of a high-voltage network when a fault is detected in said circuit;
   (B) first detection circuit means for detecting faults occurring in said high-voltage carrying circuit at any location extending from point A to at least one-half the distance to point B and for opening said first and second power switches when a fault is detected, said first detection circuit means comprising:
      (1) first fault detector means associated with point A for detecting faults occurring in said high-voltage carrying circuit at any location extending from point A to at least one-half the distance to point B;
      (2) first transmission means for generating a quiescent signal $e(t) = S_R(t) + r(t)$ when said first fault detector means does not detect a fault in said high-voltage carrying circuit and for generating a command release signal $e(t) = S_B(t) + r(t)$ when said first detector means detects a fault in said high-voltage carrying circuit;
      (3) first receiver means responsive to said signals transmitted by said first transmitter means for causing said second power switch to open when said first detector means detects a fault in said high-voltage carrying circuit, said first receiver means including means for causing said second power switch to open when a first signal $$w_R = \frac{1}{\Lambda^2} \int_{t-T}^{t} [e(\tau) - S_R(\tau)]^2 d\tau \qquad 5$$

is greater than a second signal $$w_B = \int_{t-T}^{t} [e(\tau) - S_B(\tau)]^2 d\tau \qquad 10$$

wherein $\Lambda$ is an adjustable factor greater than zero and T is a determinable time delay;

(C) second detection circuit means for detecting faults occurring in said high voltage carrying circuit at any location extending from point B to at least one-half the distance to point A and for opening said first and second power switches when a fault is detected, said first detection circuit means comprising:

(1) second fault detector means associated with point B for detecting faults occurring in said high voltage carrying circuit at any location extending from point B to at least one-half the distance to point A;

(2) second transmission means for generating a quiescent signal $e'(t) = S_R'(t) + r'(t)$ when said second fault detector means does not detect a fault in said high voltage carrying circuit and for generating a command release signal $e'(t) = S_B'(t) + r'(t)$ when said second detector means detects a fault in said high-voltage circuit;

(3) second receiver means responsive to said signals transmitted by said second transmitter means for causing said first power switch to open when said second detector means detects a fault in said high-voltage carrying circuit, said second receiver means including means for causing said first power switch to open when a first signal $$w_R' = \frac{1}{\Lambda^2} \int_{t-T}^{t} [e'(\tau) - S_R'(\tau)]^2 d\tau \qquad 45$$

is greater than a second signal $$w_B' = \int_{t-T}^{t} [e'(\tau) - S_B'(\tau)]^2 d\tau \qquad 50$$

wherein $\Lambda$ is an adjustable factor greater than zero and T is a determinable time delay.

2. The ground fault protection system of claim 1, wherein said first and second receiver means both include:

a quiescent signal generator for generating the quiescent signal $S_R(t)$;

a command release signal generator for generating the command release signal $S_B(t)$;

first and second difference circuits for forming first and second difference signals $d_R(t) = e(t) - S_R(t)$ and $d_B(t) = e(t) - S_B(t)$, respectively; and an arithmetic unit means for generating an output signal which will cause said power switch associated with said receiver means to open when $w_R$ is greater than $w_B$.

3. The ground fault detection system of claim 2 wherein said arithmetic unit means comprises:

a divider connected to the output of said first difference circuit for dividing said first difference signal by said adjustable factor $\Lambda$;

a first squaring circuit connected to the output of said divider for squaring said divided first difference signal;

a second squaring circuit connected to the output of said second difference circuit for squaring said second difference signal;

a third difference circuit having an adding and a subtracting input and a difference output, said adding input being connected to said first squaring circuit, said subtracting input being connected to said second squaring circuit;

a time delay circuit whose input is connected to said difference output of said third difference circuit and whose output is connected to a subtraction input of a fourth difference circuit;

said fourth difference circuit also including an adding input and a difference output, said adding input of said fourth difference circuit being connected to said difference output of said third difference circuit; and an integrator whose input is connected to said difference output of said fourth difference circuit and whose output is coupled to a discriminator, said discriminator adapted to generate a signal which will cause the said power switch associated with said arithmetic unit means to open when the output of said integrator is positive.

4. The ground fault protection system of claim 3 wherein each of the individual elements of said arithmetic unit means operate on an analogue basis.

5. The ground fault protection system of claim 2 wherein said arithmetic unit means comprises:

a divider connected to the output of said first difference circuit for dividing said first difference signal by said adjustable factor $\Lambda$;

a first analogue to digital converter whose input is connected to the output of said divider and whose output is connected to the input of a first digital squaring circuit;

a second analogue to digital converter whose input is connected to the output of said second difference circuit and whose output is connected to the input of a second digital squaring circuit;

a first digital difference circuit having an adding and a subtracting input and a difference output, said adding input of said first digital subtraction circuit being connected to said first digital squarer, said subtracting input of said first digital subtraction circuit being connected to the output of said second digital squarer;

a shift register whose input is connected to said difference output of said first digital difference circuit and whose output is connected to a subtracting input of a second digital subtraction circuit;

said second digital subtraction circuit also including an adding input and a difference output, said adding input of said second digital subtraction circuit being connected to said difference output of said first digital subtraction circuit, said difference output of said second digital subtraction circuit being applied to a first adding input of a digital addition circuit;

an accumulation register whose input is connected to said addition output of said digital addition circuit and whose output is connected to a second adding input of said addition circuit; and a scanning oscillator for strobing said first and second analogue to digital converters, said shift register and said accumulation register at a frequency of $1/T_A$.

6. The ground fault detection system of claim 2 including the means for generating an alarm signal when the noise signal $r(t)$ is sufficiently great so as to prevent said receiver means from causing said power switch to open when said transmission means generates said command release signal.

7. The ground fault detection system of claim 6 wherein said means for generating an alarm signal includes a second arithmetic unit means for forming the signal $$w_B \cdot \Lambda_Q^2 = \Lambda_Q^2 \int_{t-T}^{t} [\, e(\tau) - S_R(\tau)\,]^2 \, d\tau$$

in which $\Lambda_Q \approx 1/\Lambda$ is another variable factor, and wherein said second arithmetic unit means generates an output signal when the noise signal $r(t)$ generated by said transmission means is greater than a predetermined value dependent upon the value of $\Lambda_Q$;

means for monitoring the outputs of said first and second arithmetic unit means and for generating an alarm signal when the noise in the signal generated by said transmission means is sufficiently great to prevent said receiver means from opening said power switch when said transmission means generates said command release signal.

* * * * *